United States Patent
Roberts et al.

(10) Patent No.: US 10,778,416 B2
(45) Date of Patent: Sep. 15, 2020

(54) CRYPTOGRAPHIC SYSTEM MANAGEMENT

(71) Applicant: MasterCard International Incorporated, Purchase, NY (US)

(72) Inventors: David Anthony Roberts, Cheshire (GB); Alan Mushing, Cheshire (GB); Susan Thompson, Cheshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 191 days.

(21) Appl. No.: 15/822,669

(22) Filed: Nov. 27, 2017

(65) Prior Publication Data
US 2018/0183579 A1    Jun. 28, 2018

(30) Foreign Application Priority Data

Dec. 22, 2016   (EP) ..................... 16206448

(51) Int. Cl.
*H04L 9/08* (2006.01)
*H04W 12/04* (2009.01)
(Continued)

(52) U.S. Cl.
CPC ............ *H04L 9/0816* (2013.01); *G06F 21/53* (2013.01); *G06Q 20/12* (2013.01); *G06Q 20/3227* (2013.01); *G06Q 20/3278* (2013.01); *G06Q 20/3552* (2013.01); *G06Q 20/3823* (2013.01); *G06Q 20/3829* (2013.01);
(Continued)

(58) Field of Classification Search
CPC .............................. H04L 9/0816; H04W 12/04
See application file for complete search history.

(56) References Cited

U.S. PATENT DOCUMENTS

| 9,059,980 B2 * | 6/2015 | Kean ..................... H04L 9/3234 |
| 2003/0188158 A1 | 10/2003 | Kocher |

(Continued)

FOREIGN PATENT DOCUMENTS

| GB | 2522929 A | 8/2015 |
| RU | 2601140 C2 | 10/2016 |

OTHER PUBLICATIONS

"PCT International Search Report and Written Opinion", dated Jan. 29, 2018, for International Application No. PCT/US17/60276, 10 pages.

(Continued)

*Primary Examiner* — Jason Chiang
(74) *Attorney, Agent, or Firm* — Buckley, Maschoff & Talwalkar LLC

(57) ABSTRACT

A method of refreshing key material is described for use in a trusted execution environment logically protected from a regular execution environment. The trusted execution environment further comprises a key identifier. New key material is received at the trusted execution environment to replace existing key material. The key identifier is set to a new value to indicate that new key material is present. The new value of the key identifier is provided directly or indirectly to other parties in association with cryptographic outputs provided by the trusted execution environment using the refreshed key material. This approach is described in connection with an application executing securely on a mobile device.

18 Claims, 5 Drawing Sheets

(51) Int. Cl.
  *G06Q 20/38* (2012.01)
  *G06Q 20/32* (2012.01)
  *G06Q 20/34* (2012.01)
  *G06Q 20/12* (2012.01)
  *H04W 4/60* (2018.01)
  *G06F 21/53* (2013.01)
  *G06F 21/74* (2013.01)

(52) U.S. Cl.
  CPC .......... *H04L 9/0866* (2013.01); *H04L 9/0891* (2013.01); *H04L 9/0897* (2013.01); *H04W 4/60* (2018.02); *H04W 12/04* (2013.01); *G06F 21/74* (2013.01); *H04L 2209/56* (2013.01); *H04L 2209/80* (2013.01)

(56) References Cited

U.S. PATENT DOCUMENTS

| | | | |
|---|---|---|---|
| 2008/0123855 A1 | 5/2008 | Thomas et al. | |
| 2011/0038481 A1* | 2/2011 | Modave | G06Q 20/02 380/277 |
| 2012/0102334 A1 | 4/2012 | O'Loughlin et al. | |
| 2013/0262317 A1* | 10/2013 | Collinge | G06Q 20/3823 705/71 |
| 2015/0082048 A1* | 3/2015 | Ferguson | G06F 21/602 713/189 |
| 2015/0180836 A1* | 6/2015 | Wong | H04L 9/0869 713/172 |
| 2015/0270956 A1* | 9/2015 | Basmov | G06F 21/602 713/189 |
| 2016/0048678 A1 | 2/2016 | Thom et al. | |
| 2016/0056956 A1 | 2/2016 | O'Hare et al. | |
| 2016/0057619 A1* | 2/2016 | Lopez | G06F 9/455 380/247 |
| 2016/0070932 A1 | 3/2016 | Zimmer et al. | |
| 2016/0127893 A1 | 5/2016 | Mizikovsky et al. | |
| 2016/0140545 A1* | 5/2016 | Flurscheim | G06Q 20/3821 705/76 |
| 2016/0330620 A1* | 11/2016 | Babbage | H04L 63/061 |
| 2017/0250814 A1* | 8/2017 | Brickell | H04L 9/3247 |

OTHER PUBLICATIONS

Retail Financial Services Symmetric Key Management Part 1: Using Symmetric Techniques., American National Standards Institute. Feb. 4, 2004, 71 pp.
Extended EP Search Report for EP Application No. 16206448.9 dated Jun. 13, 2017, 8 pp.
"English-language Translation of Russian Office Action and Search Report", dated May 15, 2020, Federal Intellectual Services Property, for Russian Application No. 2019122798/28, 5pgs.
"Russian Office Action and Search Report", dated May 15, 2020, The Eurasian Patent Organization, Federal Intellectual Services Property, for Russian Application No. 22019122798/28, 7pgs.

* cited by examiner

CRYPTOGRAPHIC SYSTEM MANAGEMENT

CROSS-REFERENCE TO RELATED APPLICATION

This application is a U.S. National Stage filing under 35 U.S.C. § 119, based on and claiming benefit of and priority to EP Patent Application No. 16206448.9 filed Dec. 22, 2016.

FIELD OF DISCLOSURE

The present disclosure relates to management of cryptographic systems. Embodiments are particularly relevant to cryptographic systems used by applications on a device such as a mobile phone. In particular cases of interest, the cryptographic systems are implemented in a trusted execution environment logically protected from a conventional execution environment.

BACKGROUND OF DISCLOSURE

Many applications require the use of secrets and cryptographic techniques to establish secure pathways between system elements and to allow one system element to trust information as being verified by a trusted party. Cryptography is employed to an increasing extent in applications on mobile devices (such as mobile telephone handsets, tablets and laptop computers). In conventional arrangements, cryptographic functions and secrets are maintained in a physically and logically separated area to protect them against attack. In other arrangements, the cryptographic functionality is not provided in separate hardware, but is provided in a separate operating environment logically separated from a main operating environment with some assurances of protection against subversion—this may be termed a trusted execution environment (TEE).

A cryptographic system implemented in a TEE provides reasonable security against subversion, but will typically be considered more at risk than a discrete hardware module. It may therefore desirable to refresh key material in a TEE rather than to rely on a single master key to remain effective over the operating lifetime of the TEE (as will typically be the case for a hardware module). This may in practice prove challenging, as any change of key material in the TEE may affect applications in the mobile device relying on cryptographic operations performed in the TEE and will affect interactions between the mobile device and other parties that relate to cryptographic operations performed in the TEE.

It would be desirable to refresh key material in a TEE in such a way that applications in the mobile device and interactions between the mobile device and other parties can be transitioned effectively from the old key material to the new key material.

SUMMARY OF DISCLOSURE

In a first aspect, the disclosure provides a method of refreshing key material in a trusted execution environment logically protected from a regular execution environment, wherein the trusted execution environment further comprises a key identifier, the method comprising: receiving new key material at the trusted execution environment to replace existing key material; setting the key identifier to a new value to indicate that new key material is present; and providing the new value of the key identifier directly or indirectly to other parties in association with cryptographic outputs provided by the trusted execution environment using the refreshed key material.

In embodiments, the key identifier is provided as a discrete value, and is provided directly to other parties in association with cryptographic outputs provided by the trusted execution environment.

The key identifier may be provided as a discrete value, and used to diversify the new key material from a master key by using an additional level in the diversification methods. This may apply where the trusted execution environment and the regular execution environment are provided in a device, wherein the master key is held remotely from the device, and wherein the device has a device key, wherein the refreshed key material is diversified from the master key using the device key and the key identifier. In such a case, the master key may itself be diversified from a master key from the device by the device identifier.

In embodiments, the regular execution environment may comprise a regular environment application and the trusted execution environment comprise a trusted environment application associated with the regular environment application, the regular environment application and the trusted environment application forming a combined application wherein an application counter is associated with the combined application. In such a case, the application counter may be held within the trusted execution environment. The key identifier may then be held within the application counter.

In embodiments, the regular execution environment and the trusted execution environment may be disposed within a mobile computing device. This mobile computing device may be a payment device adapted to interact with a terminal of a financial transaction system, and the combined application may be a payment application, in which case the application counter may be an application transaction counter.

In a second aspect, the disclosure provides a computing infrastructure adapted to refresh key material in a trusted execution environment logically protected from a regular execution environment, wherein the trusted execution environment further comprises a key identifier, the computing infrastructure being adapted to: provide new key material at the trusted execution environment to replace existing key material; establish the key identifier at a new value to indicate that new key material is present; and provide the new value of the key identifier directly or indirectly to other parties in association with cryptographic outputs provided by the trusted execution environment using the refreshed key material.

In a third aspect, the disclosure provides a computing device comprising a trusted execution environment logically protected from a regular execution environment, wherein the computing device is adapted to refresh key material in the trusted execution environment according to the method of set out above.

BRIEF DESCRIPTION OF FIGURES

Embodiments of the disclosure will now be described, by way of example, with reference to the accompanying Figures, of which.

DESCRIPTION OF SPECIFIC EMBODIMENTS

As will be discussed below, embodiments of the disclosure may be used in a variety of technical contexts. A particularly suitable context for embodiments of the disclosure is in implementation of a payment application with cryptographic capabilities (such as is required in implementation of EMV protocols) on a computing device with no hardware security module but having a trusted execution environment (TEE) in which secrets may be held and cryptographic operations performed. However, as will be described further below, other embodiments relate to different contexts in which a regular execution environment and a trusted execution environment may be employed, such as access control and travel passes.

Figure 1:
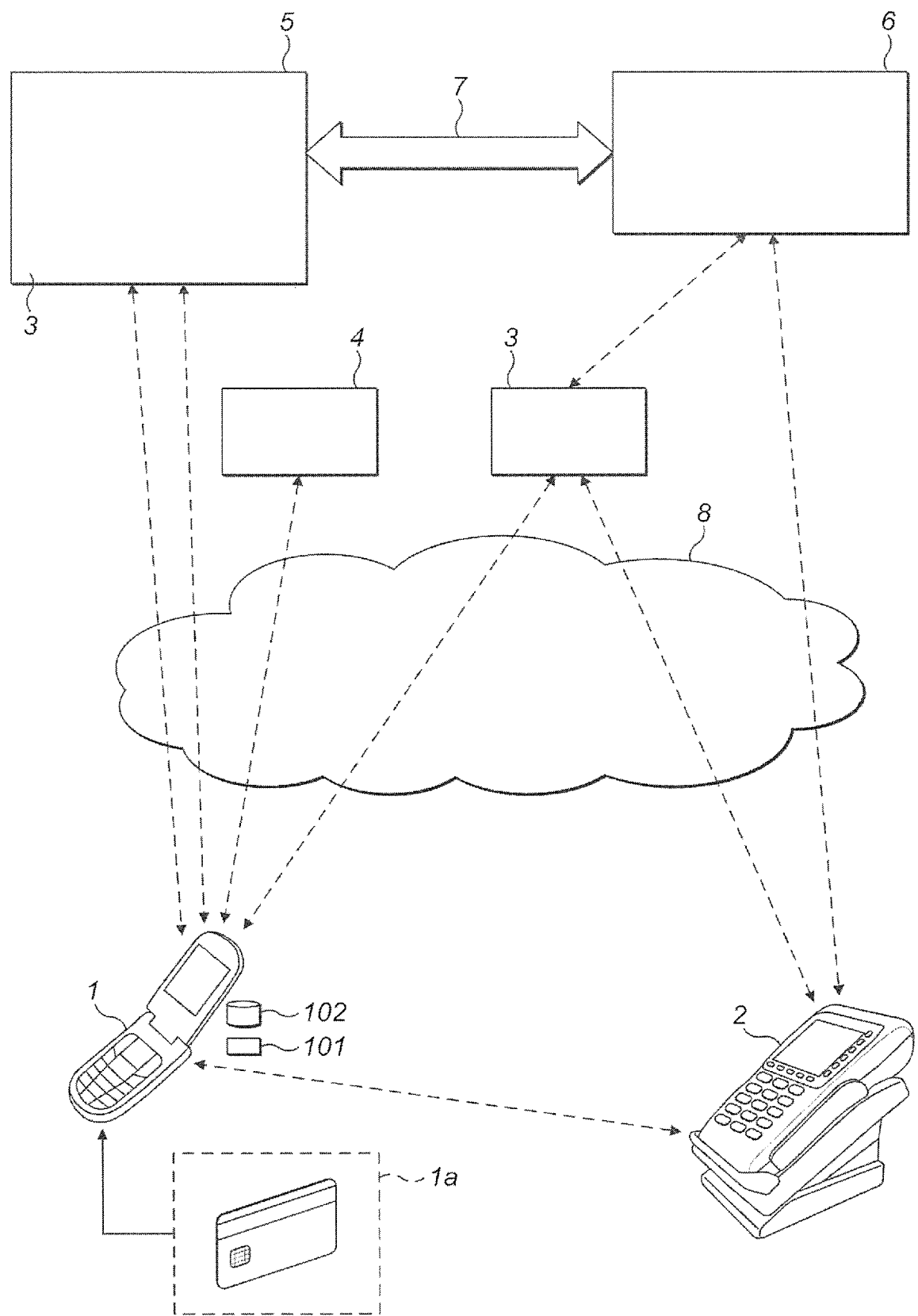
FIG. 1 shows an exemplary transaction system in which embodiments of the present disclosure may be used.
Figure 2:
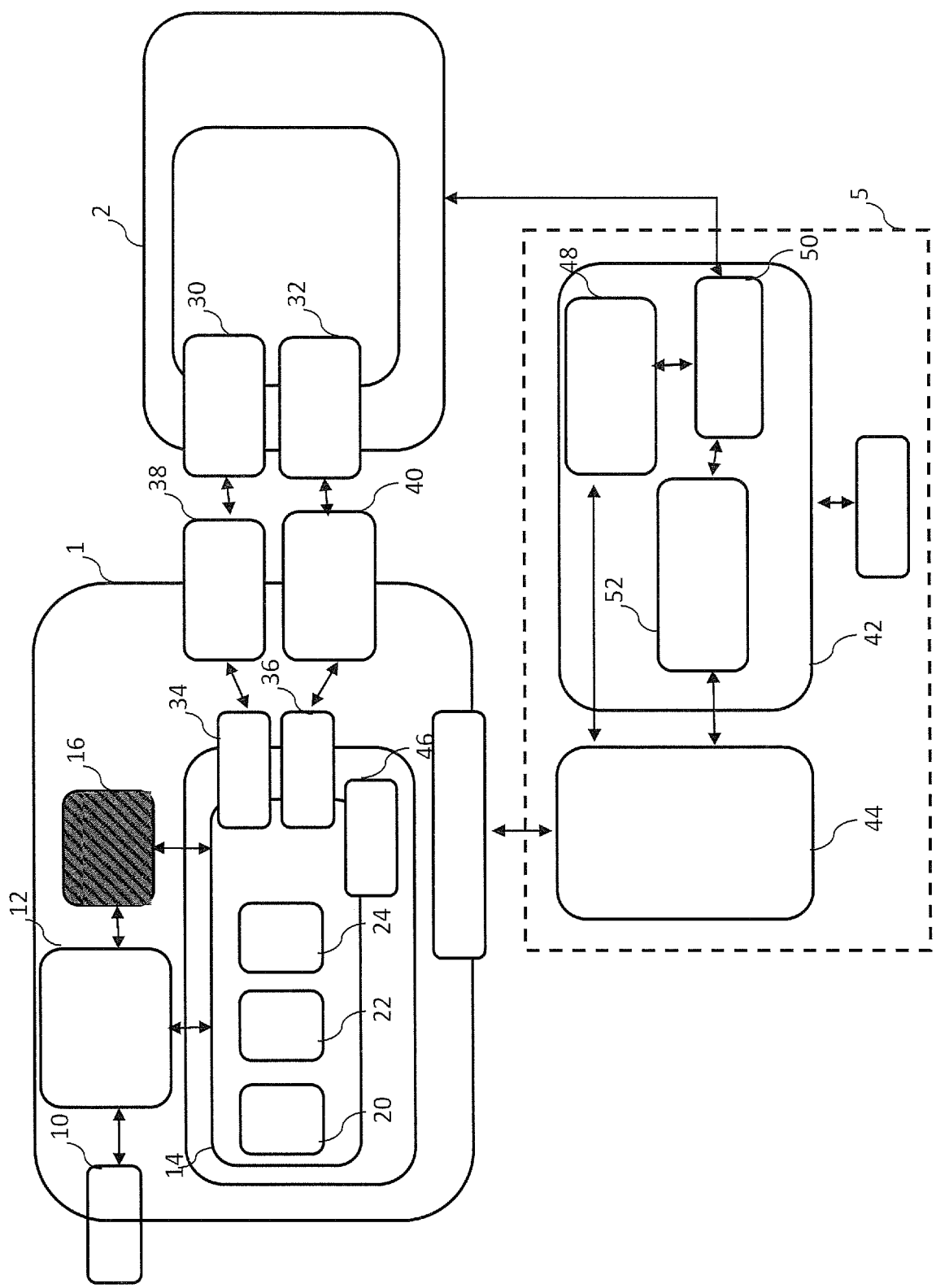
FIG. 2 shows a schematic block diagram providing further details of the mobile device, POI terminal and card issuing system according to the embodiment of FIG. 1.

FIGS. 1 and 2 show an implementation of a payment device and its use with a transaction system for which embodiments described further below are particularly suitable. Such a system is described further in the applicant's earlier International Patent Application No. PCT/US2015/068024, the disclosure of which is incorporated by reference herein to the extent permitted by applicable law.

FIG. 1 shows a transaction ecosystem in which such an arrangement may be used. A user (not shown) is provided with a payment device—this may be for example a mobile computing device, such as a mobile phone 1, acting as a proxy for a payment card 1a. The mobile device has at least one processor 101 and at least one memory 102 together providing at least one execution environment, as described further below. These devices have firmware and applications run in at least one regular execution environment (REE) with an operating system such as iOS, Android or Windows. Payment devices will typically be equipped with means to communicate with other elements of a payment infrastructure. These communication means may comprise antennae and associated hardware and software to enable communication by NFC and associated contactless card protocols such as those defined under ISO/IEC 14443, or they may comprise an antenna and associated hardware and software to allow local wireless networking using 802.11 protocols or any combination of the above.

Other computer equipment in a conventional infrastructure is typically fixed, but in cases of interest point of interaction (POI) terminals 2 may also be mobile. The example shown is a mobile point-of-sale (MPOS) terminal 2 used by a merchant interacting with the user. This type of POI terminal may support NFC-enabled transactions and/or transactions that involve the use of magnetic stripe technology. Such equipment is typically connected or connectable to an acquiring bank 6 or other system in a secure way (either through a dedicated channel or through a secure communication mechanism over a public or insecure channel—here connection is shown as passing through the public internet 8). Alternatively, the payments may be mediated by a payment gateway 3 acting for a merchant—this may be an internet payment gateway acting for an online merchant, for example, thereby enabling remote payments to be carried out.

Another element shown in this system is an online authentication service 4, which provides online authentication. There is also shown a mechanism to allow connection between the mobile device and a card issuing bank 5 or system. A banking infrastructure 7 will also connect the card issuer 5 and the acquiring bank 6, allowing transactions to be carried out between them.

FIG. 2 shows in more detail functional elements of the system of FIG. 1 which are suitable for implementing embodiments of the present disclosure, namely the mobile device 1, the POI terminal 2 and the card issuing system 5.

The mobile device 1 has at least one processor and at least one memory—these are not shown explicitly in FIG. 2 (though are shown schematically in FIG. 5), but between them they provide at least two execution environments.

A first execution environment (REE) runs the main operating system and is the environment for regular applications running on the mobile handset. A second execution environment (a trusted execution environment or TEE) is logically isolated from the first execution environment—this does not mean that there is no interaction between the two execution environments, but rather that the channels for interaction between the two environments are constrained so that data can be held and code can run securely in the TEE without risk of leakage to or subversion by processes in the REE. The TEE may have its own trusted operating system adapted to maintain this logical isolation, and also contains one or more trusted applications adapted to run in this trusted execution environment. Those applications in this disclosure which run in the TEE are indicated by diagonal lines in FIG. 2.

The mobile device 1 comprises a biometric sensor 10 and an additional user interface (not shown) suitable for user interaction during the transaction process. The sensor 10 and user interface are connected to a Trusted Shared-CVM (Card Verification Method) Application 12 (henceforth referred to as the Trusted CVM App), the operation and programming of which is specific to the operating system of the mobile device 1 (e.g. 10S, Android etc.).

The main elements in the mobile device which are usually actively involved in the data processing associated with a payment transaction are a Mobile Payment Application (MPA) 14 which runs in the REE, and a MasterCard Trusted Payment Application (MTPA) 16 which runs in the TEE.

The processing steps of a transaction are separated between the applications in the REE and the TEE. The MPA 14 in the REE provides the mobile payment functionality and may comprise multiple sub-modules which each carry out different tasks. The MPA 14 may comprise a sub-module (referred to subsequently in the figures as the MTBPCard 20) that is responsible for the management of the digitized card(s) and is programmed with the 'business logic' necessary to guide the steps of the transaction process. The MPA 14 may also comprise a sub-module (referred to subsequently in the figures as the MCMLite 22) to generate transaction data and provide a simplified implementation of a mobile SE application. The MPA 14 may further comprise a sub-module (referred to subsequently in the figures as the Mobile Kernel 24) containing the software library necessary to implement the transaction processing steps (e.g. emulate a POI terminal, build track data in case the MST interface is utilised, or to compute chip data in the case of a remote payment transaction).

In the embodiment described here, the MTPA 16 in the TEE comprises a generic cryptographic-generation engine and provides cryptographic services to the MPA 14 to support the MPA's payment processing functionality. The MTPA 16 generates a Message Authentication Code (MAC) in the form of a cryptogram which is used to verify that a particular transaction has been successfully carried out and also to indicate whether CVM was performed successfully by the Trusted CVM App 12.

This separation of functionalities between the MPA 14 running in the REE and the MTPA 16 running in the TEE provides efficient and effective partitioning of tasks and data storage, without requiring a large amount of communication between the two environments. This ensures that sensitive information is retained securely within the TEE whilst the majority of the processing can be carried out by the MPA 14 in the REE.

In order to carry out a transaction, the mobile device must be in operative communication with a merchant POI terminal 2. The POI terminal 2 comprises a contactless (CL) reader 30 and a magnetic stripe reader 32, providing the functionality to enact contactless (NFC-enabled) transactions as well as magnetic stripe (MST) transactions. To enable communication with the POI terminal, the MPA 14 in the mobile device comprises an HCE API 34 and an MST API 36, which are connected to an NFC controller 38 and a magnetic stripe induction element 40 (located outside the MPA 14 but within the mobile device) respectively. The APIs allow the MPA 14 to communicate instructions to the NFC controller 38 and the MST element 40, and facilitate the transfer of transaction-related data between the POI terminal and the mobile device, depending on the type of transaction required.

Additionally or alternatively, the mobile device may carry out remote transactions over the internet using an online payment gateway (not shown) acting for the merchant. This is enabled by providing a remote payment API in the MPA 14 which is used to communicate instructions via, for example, the internet.

The card issuing system 5 comprises a MasterCard Digital Enablement Service (MDES 42), a digitization and tokenization platform that is in operative communication with the POI terminal via a payment network (not shown). The card issuing system also comprises a wallet service provider (henceforth referred to as a KMS (Key Management Service) Wallet 44) that is in operative communication with the mobile device and the MDES 42, and via which the MDES 42 communicates with and transmits data to the MPA 14 and the MTPA 16. Specifically, the KMS Wallet 44 communicates with the mobile device via an SSL/TLS interface which provides a secure channel of communication with the MPA 14 and MTPA 16.

The MDES 42 further comprises a transaction notification service module 48, a tokenization module 50 and an account enablement system 52, the latter of which carries out the personalization and provisioning of account credentials, cryptographic keys and associated data into the MPA 14 and MTPA 16.

In order to carry out their functions, both the MPA 14 and MTPA 16 must be personalized via provisioning data that is provided by the MDES 42 via the KMS Wallet 44. In particular, during setup, the MTPA 16 is provided with provisioning data relating to the digitized card. The data is processed in the secure environment of the MTPA 16 to determine which portions are sensitive and should be retained within the TEE, and which portions are necessary for the MPA 14 to carry out the transaction and hence must be provided to the REE. Later, during a transaction, the MPA 14 will communicate with the MTPA 16 initially to notify it of the type of transaction that is being carried out; subsequent communications will involve the MPA 14 requesting an authentication code (MAC) in the form of a cryptogram from the MTPA 16 which is used to verify the transaction success.

A key stored within the TEE (or a key diversified from that key) by the MTPA 16 is used to generate the MAC, so the problem indicated previously is applicable to this system. Specific transaction processes and the provisioning and personalization of the system are not directly relevant to this problem, so are not discussed further here—the skilled person may refer to International Patent Application No. PCT/US2015/068024 for further details.

As indicated above, it may be desirable to replace the key or keys in the TEE at some point (for example when they have reached a particular age or have been used a particular number of times) to reduce the risk that the keys have been compromised. As noted, there are challenges in refreshing a key in that is used in this way in that any change of key material in the TEE may affect applications in the mobile device relying on cryptographic operations performed in the TEE and will affect interactions between the mobile device and other parties that relate to cryptographic operations performed in the TEE. It would therefore be desirable to refresh key material in a TEE in such a way that applications in the mobile device and interactions between the mobile device and other parties can be transitioned effectively from the old key material to the new key material.

Figure 3:
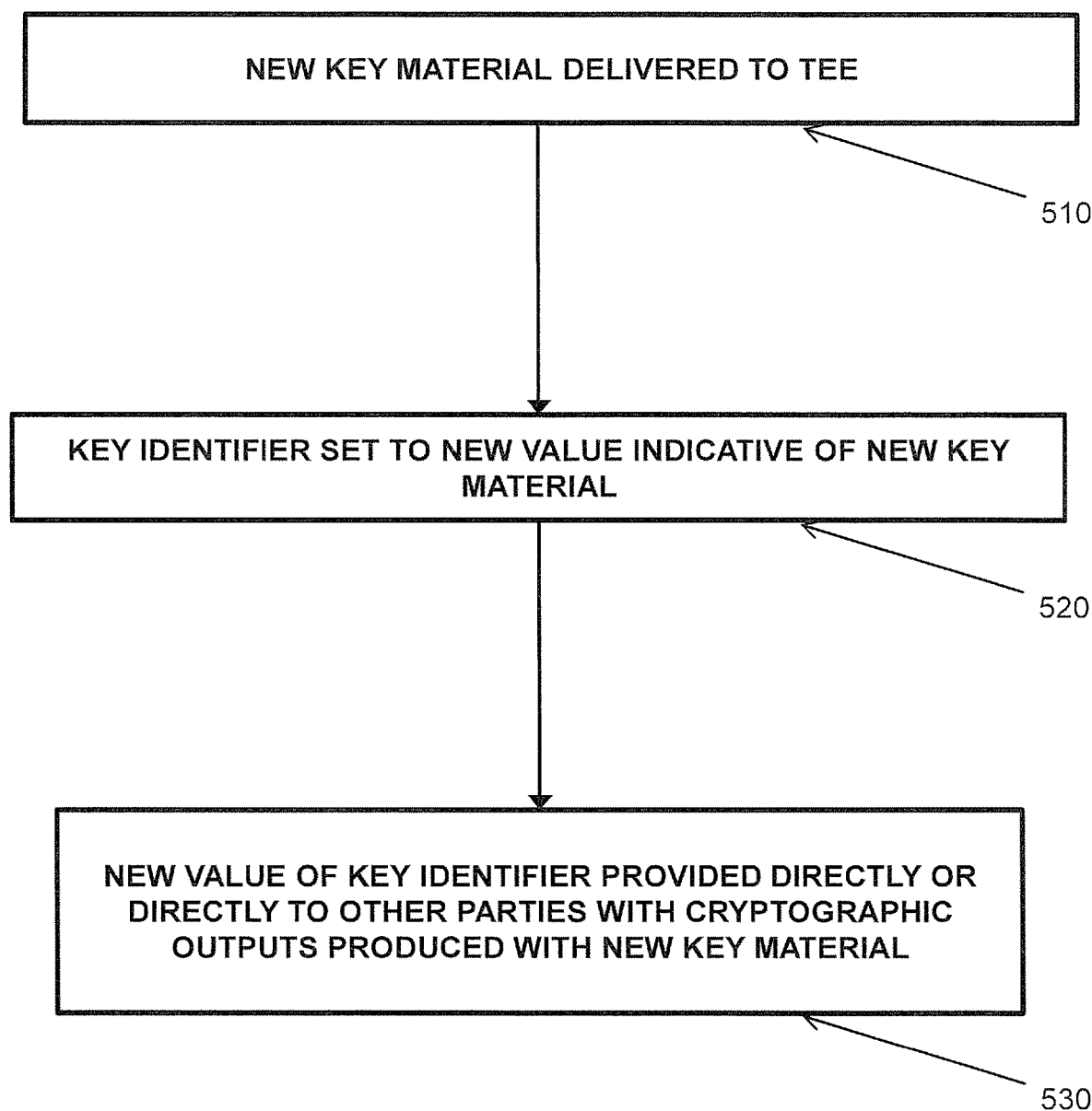
FIG. 3 is a flow diagram illustrating a generic embodiment of the disclosure.

A general approach to providing an embodiment to achieve this is shown in FIG. 3. Key material is delivered 510 to the TEE to replace the existing key material present— this may be, for example, performed by repeating some of the personalization processes used to create a personalized device. In order to indicate to other parties that key material has been refreshed, a key identifier is set to a new value 520 indicative that new key material is present, and on refresh of the key material the new value of the key identifier is provided 530 directly or indirectly to other parties in association with cryptographic outputs provided by the TEE using the refreshed key material.

In refreshing key material for an EMV card, it would be desirable to reuse the same approach adopted in initial card personalization from a generic EMV device—this is set out in the EMV Card Personalization Specification (version 1.1 dated July 2007), found at https://www.emvco.com/specifications.aspx?id=20, the contents of which are incorporated by reference here to the extent permitted by applicable law. The STORE DATA command is used to load personalization data into the card environment. Data for use in personalization is provided in a number of data groupings, each identified by a Data Grouping Identifier (DGI). As described in the specification, encryption and authentication processes are used to determine that the parties involved authenticate themselves as necessary and transfer data securely between them.

In the arrangement shown in FIGS. 1 and 2, it is desirable for the issuer to be aware that new key material is in use, and it is desirable for other system elements, such as the ATC, to operate seamlessly. This is because tracking ATC usage in a fraud management system is commonly performed in order to ensure that any successful compromise of TEE held keys or simple replay of transaction data is detected. If the ATC were to restart from 1 (a simple strategy when the key is changed) then the fraud systems would need to be aware of this change and whilst it is quite possible to do so, it is a complication that can easily be avoided. When the key is changed, it is also necessary for the authorisation systems to be able to recognize this change—for example by means of a key identifier. It should be noted that the key identifier is not the key itself, and does not allow the key to be generated—the key identifier rather enables affected parties to determine whether original or refreshed key material is used (and if refreshed, which instance or generation of key material is currently in use, in the sense of how many times the key material has been refreshed). There are several ways in which the key identifier can be implemented, as will be discussed below.

One way to implement the key identifier is to restart the ATC from a new, higher, value on key refresh. For example, considering the ATC as an n-bit number where n=a+b, the first a bits of the ATC could be used to indicate key refresh generation with b bits used for the existing ATC purpose. At key refresh, alternative implementation choices are possible—the ATC counter could effectively reset to all the b bits being equal to zero (which would be a more efficient use of available bits) or could simply continue to increment the b bits as before (which may make seamless implementation easier, as for relevant purposes a bits could simply be stripped out).

Another possible implementation is not to change the ATC, but to use a discrete key identifier. This may be achieved by using a new data field (which may require another generation of the relevant protocol) or by simply using an existing data field designed for this purpose. An existing EMV data field that can potentially be used is the Key Derivation Index (KDI) which is designed to identify the key in use by the issuer. This data field can simply be used to show the refresh generation of the key or it can be used in a more elegant fashion as described below.

Still further implementations are possible using key diversification strategies. Key diversification is a cryptographic technique by which a master key is used together with unique (in context) input to create one or more secondary keys. For example, many payment systems use this approach in establishing keys for payment devices—a master key at the issuer is diversified (for example, with a device identity) to form device keys for each device. These device keys may themselves be diversified (for example with an unpredictable number, or even with a counter) to provide session keys. The Key Derivation Index is commonly used by the issuer to identify the issuer master key to be used. However the key identifier, for example when implemented as the repurposed Key Derivation Index, may be used in a key diversification step.

One approach to implement this approach is to provide an additional key diversification step. Currently, a card master key CARDMK is diversified from an issuer master key IMK
   CARDMK:=F(PAN, IMK),
where PAN is the primary account number for the card. The card then generates session keys from the card master key
   SK:=F(ATC,CARDMK).

Figure 4:
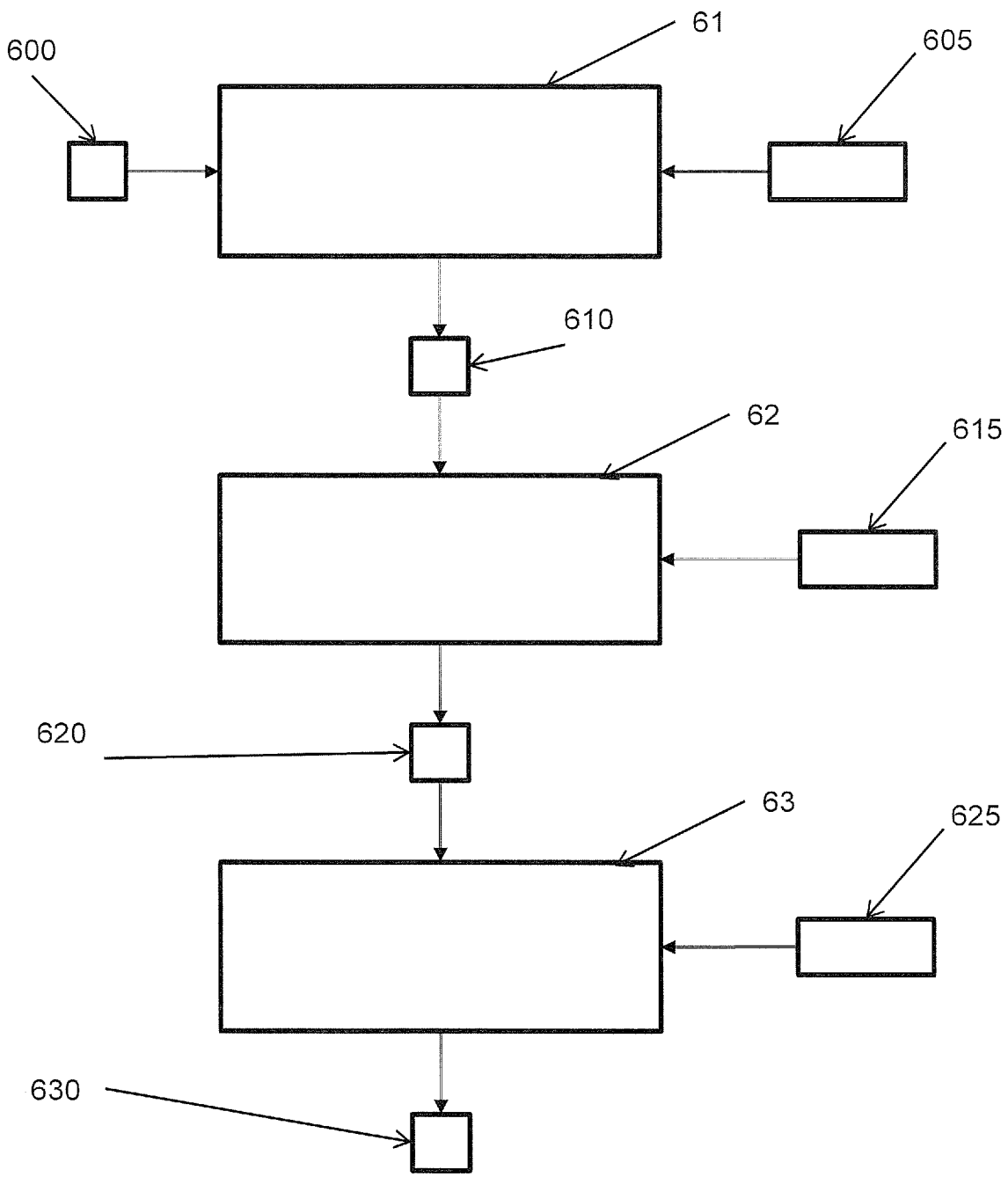
FIG. 4 shows an approach to diversifying key material from a master key according to embodiments.

In an embodiment of the disclosure as shown in FIG. 4, an additional stage is added to this diversification process. The card master key 610 may be generated as before (step 61) from the issuer master key 600 and the PAN 605, but then used to generate (step 62) an intermediate card key CARDKEY 620 from the card master key 610 and the KDI 615
   CARDKEY:=F(KDI,CARDMK)
In the architecture shown in FIG. 2, card master key 610 may be held at the MDES 42 with CARDKEY 620 AND KDI 615 sent to the card itself. Session keys 630 may be then produced (step 63) from the intermediate card key 620 and the ATC 625
   SK:=F(ATC,CARDKEY)
In this approach, the ATC can simply increment rather than requiring modification on a change of key. Without an additional key diversification step, it may be desirable to modify the ATC as indicated previously. Combination of the two approaches is also possible.

Figure 5:
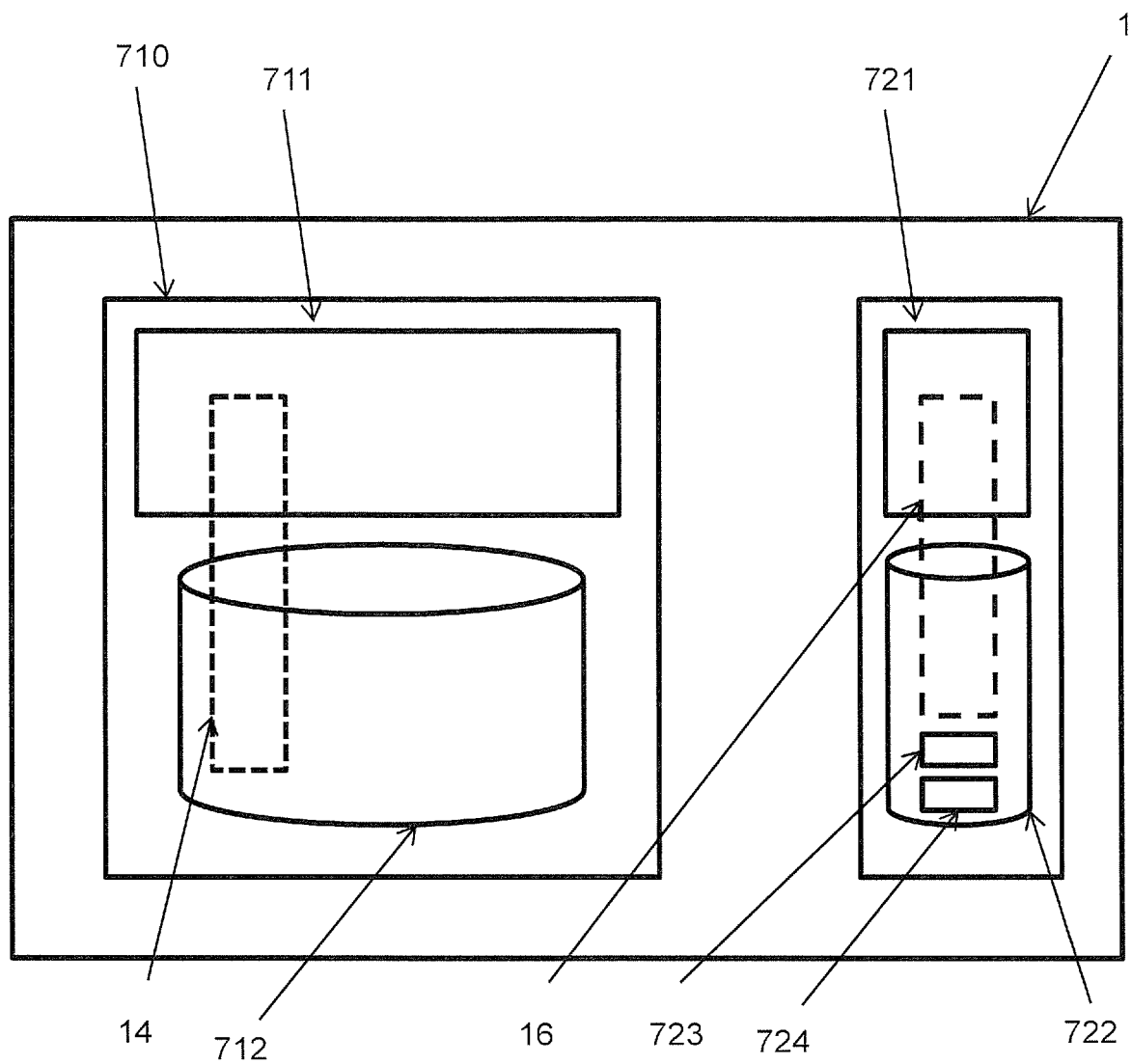
FIG. 5 shows organisation of applications and data between computational environments in an embodiment reflecting the architecture of FIGS. 1 and 2.

In considering the software environment of FIGS. 1 to 4 in the context of embodiments of the disclosure, certain modifications may be made to provide additional functional features. These modifications are shown in FIG. 5. FIG. 5 illustrates schematically the computational environment inside mobile phone 1, comprising REE 710 (having processing capability 711 and memory 712) and TEE 720 (having processing capability 721 and memory 722). As shown in FIG. 2, the Mobile Payment Application (MPA) 14 runs in the REE 710, and the MasterCard Trusted Payment Application (MTPA) 16 runs in the TEE 720. In the FIGS. 1 and 2 arrangement, the Key Derivation Index is maintained outside the Trusted Execution Environment, whereas all key material is maintained within it—in the structure of FIG. 5, the Key Derivation Index 723 is also maintained in the Trusted Execution Environment 720, so it can be read from the TEE (or included automatically in any relevant response from the TEE). This may lead to more reliable implementation on key material refresh.

In the FIG. 5 arrangement, the ATC 724 is maintained within the TEE 720—this is unchanged from the FIGS. 1 and 2 implementation—but an indication could also be added to the personalisation data to permit the ATC to be changed if required as part of a key update. As noted above, the proposed update mechanism is to use original card personalization processes employing the STORE DATA command with organisation of data according to data groupings identified by a DGI. If the Key Derivation Index is moved into the DGI that contains the keys along with any ATC update mechanism, protection benefits result. The DGI with the new data would either be protected with the original provisioning keys or with the previous key, requiring an attacker to break the product continuously in order to obtain continued use of a compromised keyset.

The method of refreshing key material in a trusted execution environment logically protected from a regular execution environment described above is described in the context of a payment device implementing EMV standards, but it is clearly not limited to this specific context and is potentially relevant to a much wider range of situations in which key material needs to be refreshed in this type of computational environment. For example, this approach may be used for any mobile computing device (such as a notebook computer or tablet) but on essentially any other computing device using such a computational environment. Such an application may be used to support a payment application, but may also be used to support any other application that runs in a main processing environment but which needs to maintain secrets (such as a biometric verification application, for example, or a travel pass application).

The invention claimed is:

1. A method of refreshing key material in a trusted execution environment logically protected from a regular execution environment, wherein the trusted execution environment and the regular execution environment are provided in a device, wherein the trusted execution environment further comprises a key identifier, the method implemented by a hardware processor and comprising:
   providing a master key held remotely from the device;
   providing a device key for the device;
   receiving new key material at an operating system of the
      trusted execution environment to replace existing key material wherein the key material is data to generate a message authentication code;

setting the key identifier to a new value to indicate that new key material is present at the operating system to generate the message authentication code, wherein the key identifier is held within an application counter, the key identifier does not allow a key to be generated, and wherein the new key material is diversified from the master key using the device key and the key identifier; and providing the new value of the key identifier directly or indirectly to other parties in association with cryptographic outputs provided by the trusted execution environment using the refreshed key material.

2. The method as claimed in claim 1, wherein the key identifier is provided as a discrete value, and is provided directly to other parties in association with cryptographic outputs provided by the trusted execution environment.

3. The method as claimed in claim 1, wherein the key identifier is provided as a discrete value.

4. The method as claimed in claim 1, wherein the master key is itself diversified from a master key from the device by the device identifier.

5. The method as claimed in claim 1, wherein the regular execution environment comprises a regular environment application and the trusted execution environment comprises a trusted environment application associated with the regular environment application, the regular environment application and the trusted environment application forming a combined application wherein the application counter is associated with the combined application.

6. The method as claimed in claim 5, wherein the application counter is held within the trusted execution environment.

7. The method as claimed in claim 5, wherein the regular execution environment and the trusted execution environment are disposed within a mobile computing device.

8. The method as claimed in claim 7, wherein the mobile computing device is a payment device adapted to interact with a terminal of a financial transaction system.

9. The method as claimed in claim 8, wherein the combined application is a payment application and where the application counter is an application transaction counter.

10. The method as claimed in claim 1, wherein the regular execution environment and the trusted execution environment are disposed within a mobile computing device.

11. The method as claimed in claim 10, wherein the mobile computing device is a payment device adapted to interact with a terminal of a financial transaction system.

12. The method as claimed in claim 11, wherein the regular execution environment comprises a regular environment application and the trusted execution environment comprises a trusted environment application associated with the regular environment application, the regular environment application and the trusted environment application forming a combined application wherein the application counter is associated with the combined application, and wherein the combined application is a payment application.

13. The method as claimed in claim 12 where the application counter is an application transaction counter.

14. A computing infrastructure comprising a computing device with at least one hardware processor, the computing infrastructure adapted to refresh key material in a trusted execution environment including a first operating system with processing capability, the trusted execution environment logically protected from a regular execution environment including a second operating system with processing capability, wherein the trusted execution environment and the regular execution environment are provided in the computing device, wherein the trusted execution environment further comprises a key identifier, the computing infrastructure being adapted to:

provide a master key held remotely from the computing device;

provide a device key for the computing device;

provide new key material at the trusted execution environment to replace existing key material, wherein the key material is data to generate a message authentication code;

establish the key identifier at a new value to indicate that new key material is present at the trusted execution environment to generate the message authentication code, wherein the key identifier is held within an application counter, the key identifier does not allow a key to be generated, and wherein the new key material is diversified from the master key using the device key and the key identifier; and provide the new value of the key identifier directly or indirectly to other parties in association with cryptographic outputs provided by the trusted execution environment using the refreshed key material.

15. A computing device comprising a trusted execution environment logically protected from a regular execution environment, wherein the trusted execution environment and the regular execution environment are provided in the computing device, wherein the trusted execution environment further comprises a key identifier, wherein the computing device further comprises a hardware processor and a memory, the computing device is adapted to refresh key material in the trusted execution environment by:

providing a master key held remotely from the device;

providing a device key for the device;

receiving new key material at the trusted execution environment to replace existing key material, wherein the key material is data to generate a message authentication code;

setting the key identifier to a new value to indicate that new key material is present at the trusted execution environment to generate the message authentication code, wherein the key identifier is held within an application counter, the key identifier does not allow a key to be generated, and wherein the new key material is diversified from the master key using the device key and the key identifier; and providing the new value of the key identifier directly or indirectly to other parties in association with cryptographic outputs provided by the trusted execution environment using the refreshed key material.

16. The computing device of claim 15, wherein the regular execution environment comprises a regular environment application and the trusted execution environment comprises a trusted environment application associated with the regular environment application, the regular environment application and the trusted environment application forming a combined application wherein the application counter is associated with the combined application, and wherein the regular execution environment and the trusted execution environment are disposed within a mobile computing device.

17. The computing device of claim 16, wherein the mobile computing device is a payment device adapted to interact with a terminal of a financial transaction system.

18. The computing device of claim 17, wherein the combined application is a payment application.

\* \* \* \* \*